July 5, 1960

G. D. LEGGE 2,944,145

DOME AND READING LAMP ASSEMBLY

Filed Aug. 7, 1958

INVENTOR.
George D. Legge
BY
G. E. McGlynn Jr.
ATTORNEY

July 5, 1960  G. D. LEGGE  2,944,145
DOME AND READING LAMP ASSEMBLY
Filed Aug. 7, 1958  3 Sheets-Sheet 2
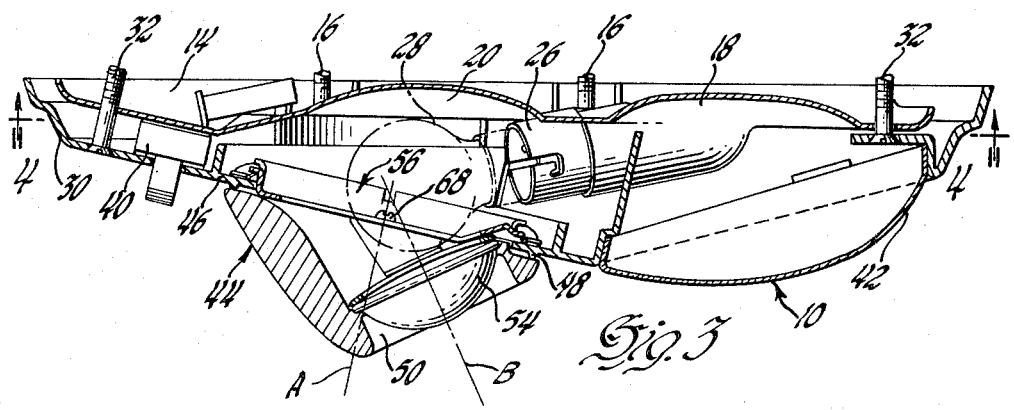
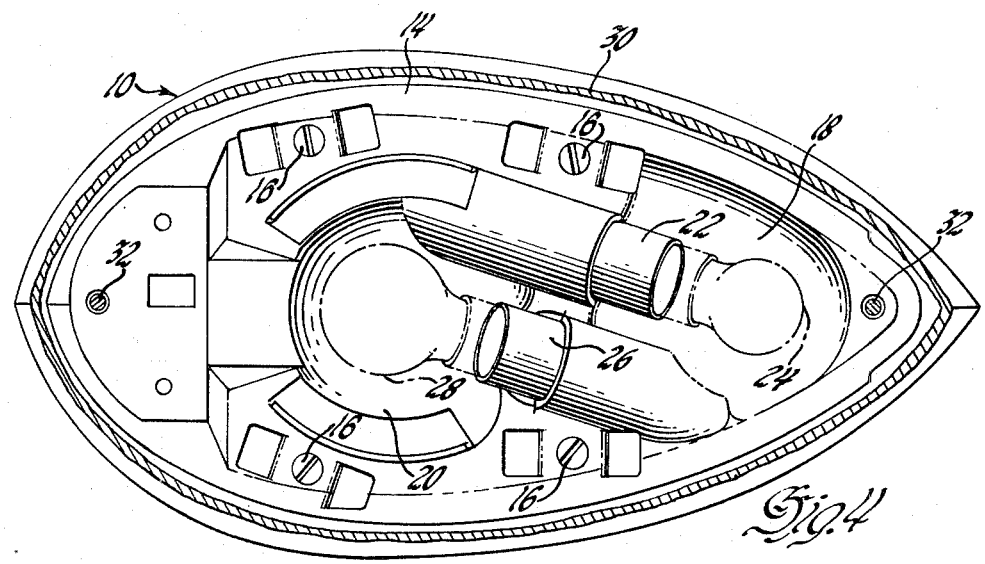
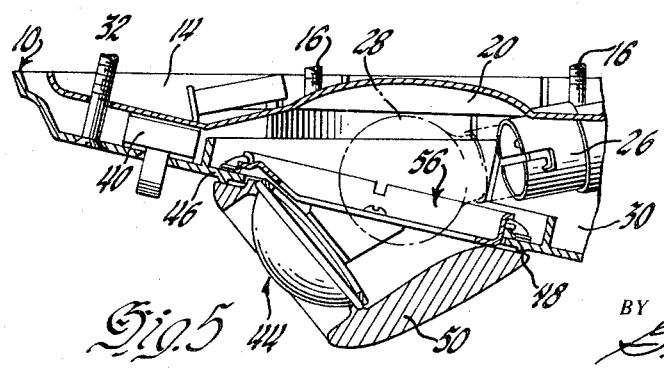
INVENTOR.
George D. Legge
BY
G. E. McGlynn Jr.
ATTORNEY

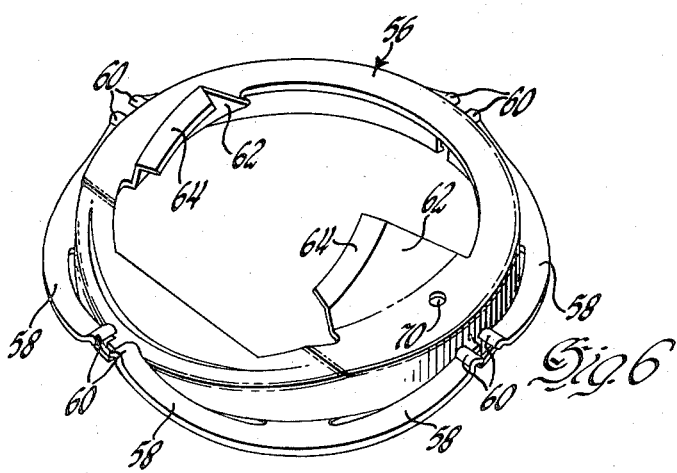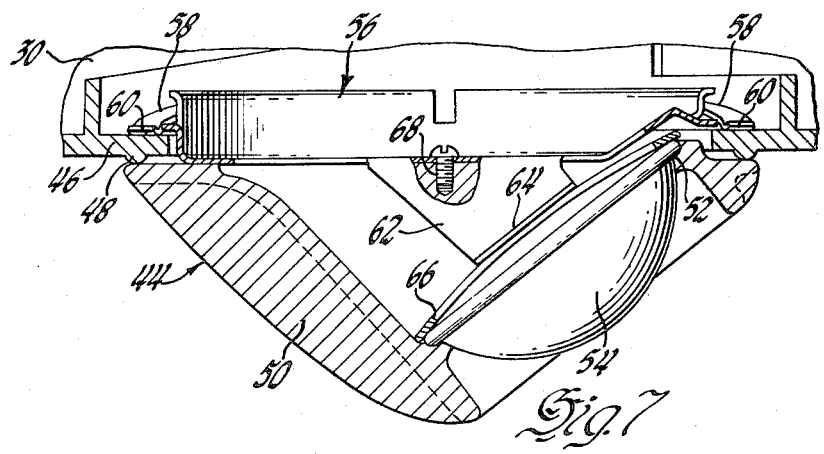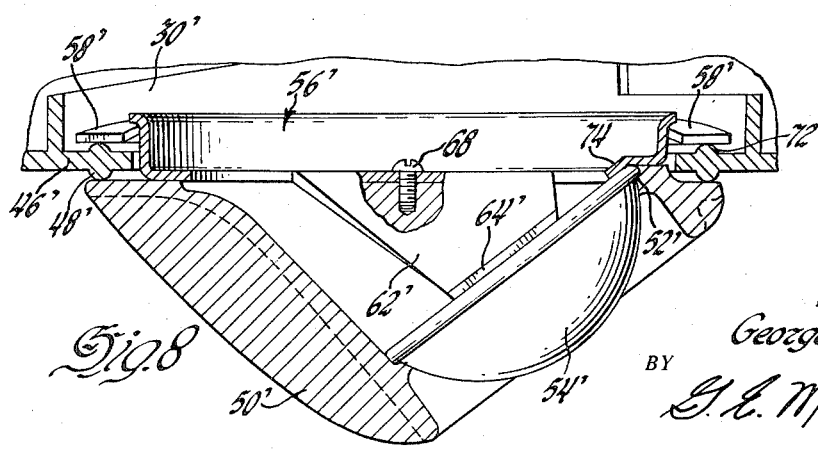

United States Patent Office 2,944,145
Patented July 5, 1960

2,944,145

DOME AND READING LAMP ASSEMBLY

George D. Legge, Farmington, Mich., assignor to General Motors Corporation, Detroit, Mich., a corporation of Delaware Filed Aug. 7, 1958, Ser. No. 753,694

9 Claims. (Cl. 240—7.35)

This invention relates to a reading lamp assembly and, in particular, to that type of assembly which is selectively rotatably mounted within the interior of a vehicle passenger compartment to provide a concentrated beam of reading light in various portions of the compartment as desired by the occupants thereof.

Heretofore, it has been proposed to provide selectively adjustable reading lamp assemblies for various types of vehicles including trains, buses, aircraft and conventional automobiles. As will be apparent, the purpose of such assemblies is to enable the vehicle occupants to adjust the direction of the lamp assembly as desired to provide a concentrated beam of reading light. Prior devices of this type have typically included a socket-like support member in which a ball-like lens support has been universally swivelly mounted. Prior devices of this type leave much to be desired from the standpoint of simplified construction, ease of assembly and maintenance thereof. This is particularly true with respect to conventional automotive vehicles which are mass produced and which, in the interest of economy and facilitation of assembly, require a reading lamp assembly which is relatively inexpensive, easily and rapidly installed and simply maintained.

It is, therefore, a principal object and feature of this invention to provide a reading lamp assembly which is rotatably adjustable to supply a concentrated beam of reading light to various portions of a vehicle passenger compartment at the will of the occupants thereof.

It is yet another object of this invention to provide such an assembly having a single fixed axis of rotatable adjustment thereby providing a path of light adjustment which will sweep the desired portions of the vehicle passenger compartment.

More particularly, it is an object of this invention to provide a lamp assembly of the type aforementioned including a simple but efficient means for rotatably mounting and adjustably supporting a light-concentrating reading lens with respect to a lamp body whereby the lens support may be rotated about a fixed axis at a constant angle to the optical axis of the lens to provide a concentrated beam of reading light at occupied portions of the vehicle seat or seats.

In general, these and other objects of this invention are obtained in combination with a lamp structure having a mounting flange defining an opening therein, and a lens support assembly including an annular seat in which the periphery of a suitable light-concentrating lens is adapted to be disposed and mounted. The lens is maintained on its seat on the lens support and the latter is rotatably mounted on the exterior surface of the mounting flange by a retaining structure. The retaining structure comprises a retaining ring suitably secured to the lens housing, and including a plurality of pairs of circumferentially spaced spring fingers yieldably engaging the interior surface of the mounting flange to maintain the lens support in abutment with the mounting flange. A pair of oppositely disposed support arms are secured to the retaining ring and are operatively related to the lens to maintain the latter on its seat in the support. The lens support is adapted to be manually rotatably adjusted about a fixed axis generally normal to the plane of the aforementioned mounting flange, while the optical axis of the lens mounted in the support is at an angle to the aforementioned axis of lens support adjustment. The assembly is so mounted within the interior of the vehicle passenger compartment so that, upon rotation of the lens support, the concentrated beam of light passing through the lens will sweep among the seats within the compartment to provide a suitably directed beam of reading light.

These and other objects and features of this invention will appear more fully hereinafter as the description of the invention proceeds, and in which reference is made to the following drawings in which:

Figure 3 is a section taken on line 3—3 of Figure 2;

Figure 4 is a section taken on line 4—4 of Figure 3;

Figure 5 is a reduced fragmentary view corresponding to Figure 3 except showing the reading lens in an adjusted position corresponding to the dotted line position of Figure 2;

Figure 6 is a perspective view of the retaining structure;

Figure 7 is an enlarged fragmentary view corresponding to Figure 3 illustrating certain details of the invention; and Figure 8 is a view corresponding to Figure 7, but illustrating another embodiment of the invention.

As aforementioned, reading lamp assemblies of the type herein described may be employed with various types of vehicles, but reference will be made herein specifically to a conventional automotive vehicle for the purpose of illustrating preferred embodiments of the invention.

Figure 1:
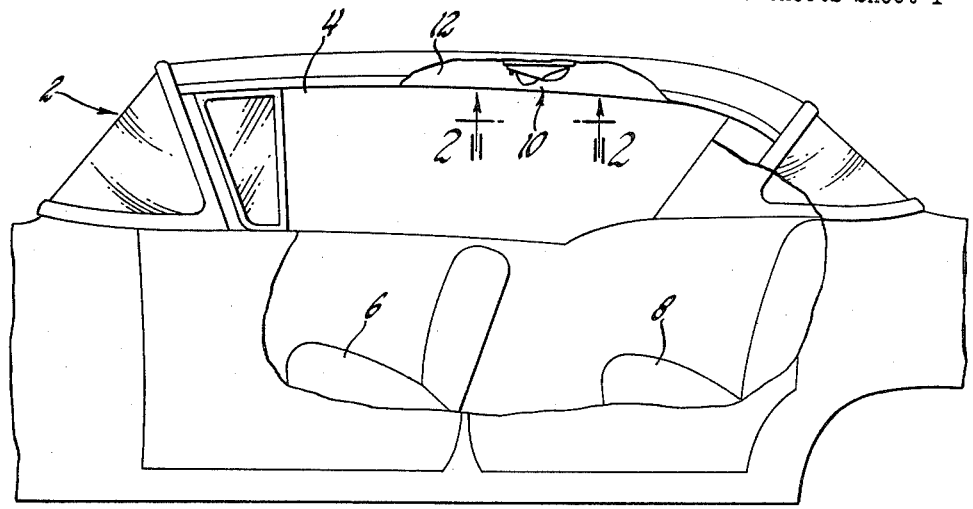
Figure 1 is a fragmentary side elevation, partially broken away, of an automobile equipped with the invention.
Figure 2:
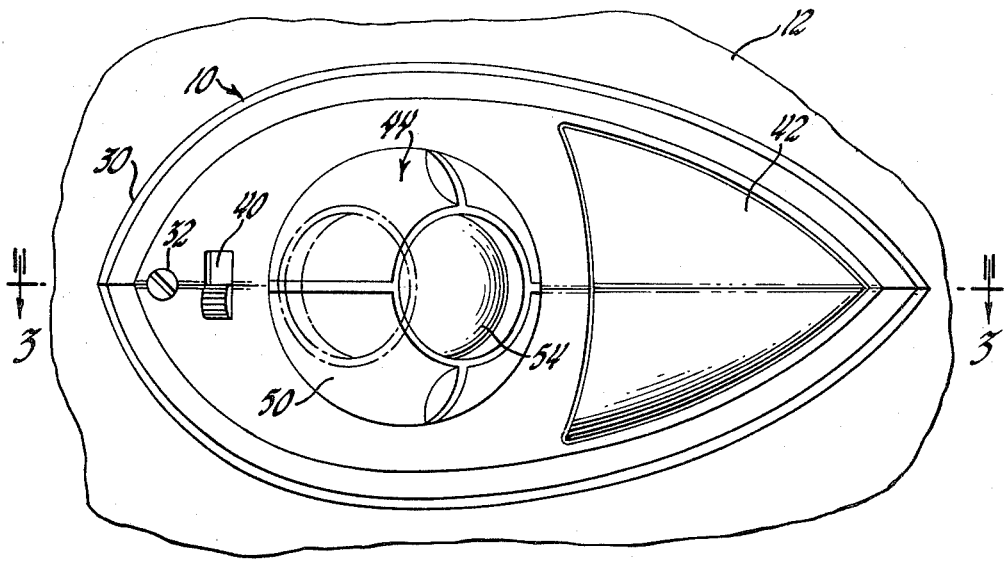
Figure 2 is an enlarged view taken on line 2—2 of Figure 1.

Referring now to the drawings, and particularly Figure 1 thereof, the numeral 2 indicates an automobile having a vehicle passenger compartment 4 in which there are the front and rear seats 6 and 8, respectively. A reading lamp assembly 10 is secured to the ceiling 12 of the passenger compartment.

Referring now to the embodiment of the invention shown in Figures 2 through 7, the assembly may be seen to comprise a body structure including a lamp base 14 suitably secured as by plural screws 16 to a roof bow or other structural member on the ceiling 12 of the passenger compartment. The lamp base 14 is suitably formed to provide a dome lamp reflector 18 and a reading lamp reflector 20 which, as desired, may be painted with aluminum or otherwise given a high reflective lustre. A dome lamp socket 22 is suitably secured as by welding to the lamp base 14 so as to receive a light source such as the light bulb 24 which overlies the reflector 18. Similarly, a reading lamp socket 26 is secured as by welding to the lamp body to receive a light source 28 projecting in a direction opposite to the dome lamp socket and overlying the reading lamp reflector 20. The body structure also includes a door or trim member 30 suitably secured to the base member 14 as by screws 32. The door 30 is suitably apertured so as to receive an outwardly projecting operating member of the switch 40 which is suitably secured to the base member 14. The switch 40 is operatively electrically connected to the reading lamp 28 to permit selective illumination of the latter in the well known manner, while other means such as door-controlled switches may be employed to illuminate the dome lamp 24. However, it will be appreciated that the switch 40 may be adapted to illuminate one or the other or both of the lamps.

The dome lamp compartment of the body structure is closed by a dome lamp lens 42 suitably secured on the door or trim member 30. The dome lamp lens 42 is preferably a clear plastic member through which a general purpose light will be projected from the dome lamp 24. On the other hand, the reading lamp compartment is closed by a rotatably adjustable reading light lens support assembly 44 which will now be described.

Referring to the first embodiment of the invention as shown particularly in Figures 6 and 7, it may be seen that the door 30 has an annular mounting flange 46 defining an opening in the body structure of the lamp assembly. An annular bearing rib 48 is formed on the exterior surface of the mounting flange for bearing engagement with the annular periphery of a stylized lens support or housing 50 of the lens support assembly 44. The housing 50 is provided with an annular seat or shoulder 52 to receive the annular periphery of the light-concentrating reading lamp lens 54. In order to hold the housing 50 adjustably on the bearing rib 48 and to maintain the reading light lens on its seat, there is provided a retaining structure comprising the annular retaining ring 56 having a plurality of circumferentially spaced pairs of yieldable bowed spring fingers 58. The terminal end 60 of each of these fingers is curved to form a bearing which rests against the mounting flange 46 interiorly of the lamp body opposite the bearing rib 48. A pair of oppositely disposed generally upstanding support arms 62 are formed integral with the retaining ring, and project toward the lens periphery. The upper ends 64 of the support arms are spaced from the lens, and are radially inwardly bent to form a seat to receive a curved annular spring washer 66 which engages and biases the lens periphery onto the seat 52. The retaining structure is suitably secured to the lens housing 50 as by screws 68 extending through apertures 70 in the retaining ring and received by the housing.

Referring to Figure 3, it will be noted that the lens housing 50 is mounted for rotation about a fixed axis A which extends substantially normally to the plane of the mounting flange 46, while the optical axis B of the light-concentrating lens is at a fixed angle relative to the axis A of housing rotation. The assembly is initially installed on the ceiling of the passenger compartment so that the housing 50 may be rotated to sweep a concentrated beam of light as desired to any portion of either of the vehicle seats for reading purposes. It will be appreciated that the retaining structure comprising the spring fingers 58 yieldably and frictionally maintains the housing on the bearing rib 48 in any selected position of the housing, while permitting manual adjustment of the latter. The support arms 62 which are secured to the retaining ring act through the curved spring washer 66 to firmly maintain the lens on its seat.

Referring now to the embodiment of Figure 8, it may be seen to be quite similar to that previously described, primed numerals indicating parts corresponding to the first embodiment. In this embodiment, however, the interior surface of the mounting flange 46' is provided with a bearing rib 72 like rib 48'. The ends of the bowed spring fingers 58' formed integral with the retaining ring 56' yieldably and frictionally engage the bearing rib 72 to hold the housing 50' in any selected adjusted position while permitting adjustment thereof.

In retaining the lens on its seat within the housing, the upstanding support arms 62' are provided with radially inwardly directed shoulders 64' as before, but in this case the shoulders directly engage the periphery of the lens. Additionally, a generally radially inwardly directed lip 74 on the retaining ring 56' engages a portion of the lens periphery to aid in maintaining the latter on its seat.

With respect to the latter embodiment, it will be appreciated that the axis of housing rotation and the mounting of the optical axis of the light-concentrating lens is as before. Moreover, the lens housing and therefore the beam of concentrated light can be adjusted to any desired direction in a manner corresponding to that previously described.

Having disclosed preferred embodiments of the invention, it is to be understood that this description is merely for the purpose of illustration and in no way is intended to limit the scope of the invention which is defined by the claims which follow.

I claim:

1. In combination with a lamp body having an opening therein, a lens mounting assembly; said assembly comprising a lens support including a lens seat rotatably mounted on said body to form a closure for said body opening, said support being selectively rotatably adjustable about a fixed axis, a light-concentrating lens mounted on said seat with the optical axis of said lens at a fixed angle to the axis of rotation of said support, and means retaining said lens on said seat and holding said lens support on said body, said retaining means including an annular retaining ring secured to said support, a plurality of spaced spring fingers on said retaining ring yieldably engaging said body, and means secured to said retaining ring and maintaining said lens on said seat.

2. In combination with a lamp body having an annular mounting flange defining a body opening, a lens mounting assembly; said assembly comprising a lens support including a lens seat rotatably mounted on said mounting flange over said body opening, said support being selectively rotatably adjustable about a fixed axis, a light-concentrating lens having its periphery mounted on said seat with the optical axis of said lens at a fixed angle to the axis of rotation of said support, and means retaining said lens on said seat and holding said lens support on said mounting flange, said retaining means including an annular retaining ring secured to said support, a plurality of circumferentially spaced pairs of spring fingers on said retaining ring yieldably engaging said mounting flange interiorly of said body, a pair of laterally spaced arms secured to said retaining ring and projecting toward the periphery of said lens, and an annular bowed spring washer supported on said arms and engaging the periphery of said lens to maintain the latter on said seat.

3. In combination with a lamp body having an annular mounting flange defining a body opening, a lens mounting assembly; said assembly comprising a lens support including a lens seat rotatably mounted on said mounting flange to form a closure for said body opening, said support being selectively rotatably adjustable about a fixed axis, a light-concentrating lens having its periphery mounted on said seat with the optical axis of said lens at a fixed angle to the axis of rotation of said support, and means retaining said lens on said seat and holding said lens support on said mounting flange, said retaining means including an annular retaining ring secured to said support, a plurality of spaced spring fingers on said retaining ring yieldably engaging said mounting flange opposite said support, arm means secured to said retaining ring and projecting toward the periphery of said lens, and an annular spring washer supported on said arm means and engaging the periphery of said lens to maintain the latter on said seat.

4. In combination with a lamp body having an annular mounting flange defining a body opening, a lens mounting assembly; said assembly comprising a lens support including a lens seat rotatably mounted on said mounting flange over said body opening, said support being selectively rotatably adjustable about a fixed axis, a light-concentrating lens having its periphery mounted on said seat with the optical axis of said lens at a fixed angle to the axis of rotation of said support, and means retaining said lens on said seat and holding said lens support on said mounting flange, said retaining means including an annular retaining ring secured to said support, a plurality of spaced spring fingers on said retaining ring yieldably engaging said mounting flange interiorly of said body, and a bowed spring washer supported on said retaining ring and engaging the periphery of said lens to maintain the latter on said seat.

5. In combination with a lamp body having an annular mounting flange defining a body opening, a lens support assembly; said assembly comprising a lens support including a lens seat, said lens support being rotatably mounted on the exterior surface of said mounting flange over said body opening to form a closure for the latter, a light-concentrating lens having its periphery mounted on said seat, and means for retaining said lens on said seat and holding said support on said mounting flange, said retaining means including an annular retaining ring having a plurality of circumferentially spaced pairs of spring fingers, the ends of each of said spring fingers being curved to a bearing yieldably engaging said body flange interiorly of said body, a pair of oppositely disposed generally outwardly projecting support arms secured to said retaining ring, and an annular bowed spring washer supported on the upper ends of said arms and engaging the periphery of said lens to maintain the latter on said seat.

6. A reading lamp assembly comprising a lamp body having an annular mounting flange defining a body opening, an annular upstanding bearing rib formed on the exterior surface of said mouting flange and surrounding said body opening, a lens support including a lens seat rotatably mounted on said bearing rib over said body opening, said support being selectively rotatably adjustable on said bearing rib about a fixed axis, a light-concentrating lens having its periphery mounted on said seat with the optical axis of said lens at a fixed angle to said axis, and means for retaining said lens on said seat and holding said support on said bearing rib, said retaining means including an annular retaining ring having a plurality of circumferentially spaced pairs of spring fingers, each of said fingers including a curved bearing portion yieldably engaging said mounting flange interiorly of said body, a pair of oppositely disposed generally outwardly projecting support arms secured to said retaining ring and having their upper ends spaced from the periphery of said lens, and an annular curved spring washer resting on said arms and engaging the periphery of said lens to maintain the latter on said seat.

7. A reading lamp assembly comprising a lamp body having an annular mounting flange defining a body opening, an annular upstanding bearing rib formed on the exterior surface of said mounting flange and surrounding said body opening, a lens support including an annular lens seat, said support being rotatably mounted on said bearing rib over said body opening and forming a closure for the latter, said support being selectively rotatably adjustable about a fixed axis substantially normal to the plane of said bearing rib, a light-concentrating lens having its periphery mounted on said seat with the optical axis of said lens at a fixed angle to the axis of rotation of said support, and means for retaining said lens on said seat and holding said support on said mounting flange, said retaining means including an annular retaining ring having a plurality of circumferentially spaced pairs of spring fingers, the ends of each of said spring fingers being curved to yieldably engage said mounting flange interiorly of said body, a pair of oppositely disposed lens support arms secured to said retaining ring, said support arms projecting from said retaining ring toward said lens in a direction generally parallel to the optical axis of the latter, and an annular curved spring washer mounted on said support arms and operatively engaging the periphery of said lens to maintain the latter on said seat.

8. The combination with a lamp body having an annular mounting flange defining a body opening, of a lens mounting assembly; said assembly comprising a lens support including a lens seat, said support being mounted exteriorly of said lamp body on said mounting flange, a light-concentrating lens mounted on said seat, and retaining means secured to said support for maintaining said lens on said seat and holding said support on said mounting flange, said retaining means including a retaining ring secured to said support and yieldably engaging said mounting flange opposite said support, spaced arm means secured to said retaining ring and projecting toward the periphery of said lens, and an annular bowed spring washer supported on said arm means and engaging the periphery of said lens to maintain the latter on said seat.

9. A reading lamp assembly comprising a lamp body having an annular mounting flange defining a body opening, an annular upstanding bearing rib formed on the exterior surface of said mouting flange and surrounding said body opening, a lens support including a lens seat rotatably mounted on said bearing rib over said body opening, said support being selectively rotatably adjustable about a fixed axis on said bearing rib, a light-concentrating lens having its periphery mounted on said seat with the optical axis of said lens at a fixed angle to said axis, and means for retaining said lens on said seat and holding said support on said bearing rib, said retaining means including an annular retaining ring having a plurality of spaced spring fingers, each of said fingers including an end portion yieldably engaging said mounting flange interiorly of said body, and a pair of oppositely disposed generally outwardly projecting support arms secured to said retaining ring and having their outer ends engaging the periphery of said lens to maintain the latter on said seat.

References Cited in the file of this patent

UNITED STATES PATENTS

| | | |
|---|---|---|
| 1,677,074 | Corcoran | July 10, 1928 |
| 1,678,137 | Douglas | July 24, 1928 |
| 2,225,217 | Hicok | Dec. 17, 1940 |
| 2,293,326 | Arenberg | Aug. 18, 1942 |